United States Patent
Koosha et al.

(10) Patent No.: US 10,135,696 B2
(45) Date of Patent: *Nov. 20, 2018

(54) CONTROL AND MONITORING OF BATTERY-BACKED EMERGENCY LIGHTING SYSTEMS

(71) Applicant: Dialight Corporation, Farmingdale, NJ (US)

(72) Inventors: Eman Koosha, Manalapan, NJ (US); Kevin Hebborn, Toms River, NJ (US); Rizwan Ahmad, Edison, NJ (US)

(73) Assignee: Dialight Corporation, Farmingdale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,136

(22) Filed: May 8, 2017

(65) Prior Publication Data
US 2017/0244609 A1  Aug. 24, 2017

Related U.S. Application Data

(63) Continuation of application No. 14/645,010, filed on Mar. 11, 2015, now Pat. No. 9,679,448.

(51) Int. Cl.
*G08B 5/00* (2006.01)
*H04L 12/24* (2006.01)
(Continued)

(52) U.S. Cl.
CPC .............. *H04L 41/22* (2013.01); *G08B 5/36* (2013.01); *H02J 9/02* (2013.01); *H04W 76/10* (2018.02); *H05B 33/0845* (2013.01); *H05B 33/0884* (2013.01); *H05B 37/0272* (2013.01); *H02J 9/065* (2013.01); *H04L 67/02* (2013.01); *H04W 84/12* (2013.01)

(58) Field of Classification Search
CPC .......... G08B 7/062; G08B 7/06; H05B 37/02; H05B 37/03; H05B 33/0845; H05B 33/0842
USPC .. 340/870.02, 524, 506, 514, 539.17, 815.4; 315/86, 291, 152, 292, 155
See application file for complete search history.

(56) References Cited

U.S. PATENT DOCUMENTS

| 5,154,504 A | 10/1992 | Helal et al. |
| 8,445,826 B2 | 5/2013 | Verfuerth |

(Continued)

OTHER PUBLICATIONS

Office Action received in corresponding Canadian Application No. 2,976,012, dated Jun. 15, 2018, pp. 1-3.

*Primary Examiner* — Hoi Lau

(57) ABSTRACT

The present disclosure is directed to a method, non-transitory computer readable medium and apparatus for remotely receiving information from and configuring a battery-backed emergency lighting system. In one embodiment, the method includes establishing a wireless communication session with a web server via a wireless fidelity (WiFi) connection, receiving a request for information related to the battery-backed emergency lighting system and a request to change a configuration of the battery-backed emergency lighting system over the wireless communication session, configuring the battery-backed emergency lighting system in accordance with the request to change the configuration and sending the information that is requested.

18 Claims, 3 Drawing Sheets

(51) Int. Cl.
*G08B 5/36* (2006.01)
*H04W 76/10* (2018.01)
*H02J 9/02* (2006.01)
*H05B 33/08* (2006.01)
*H05B 37/02* (2006.01)
*H02J 9/06* (2006.01)
*H04L 29/08* (2006.01)
*H04W 84/12* (2009.01)

(56) References Cited

U.S. PATENT DOCUMENTS

| | | | | |
|---|---|---|---|---|
| 9,679,448 | B2* | 6/2017 | Koosha | H04W 76/10 |
| 2004/0065451 | A1* | 4/2004 | McSheffrey | A61N 1/39 |
| | | | | 169/75 |
| 2005/0149280 | A1* | 7/2005 | Sharma | G01R 31/3631 |
| | | | | 702/63 |
| 2006/0139161 | A1* | 6/2006 | Beghelli | G08B 7/062 |
| | | | | 340/514 |
| 2008/0266076 | A1* | 10/2008 | Barrieau | G08B 7/06 |
| | | | | 340/506 |
| 2009/0243836 | A1* | 10/2009 | McSheffrey | A61N 1/39 |
| | | | | 340/524 |
| 2010/0141153 | A1* | 6/2010 | Recker | H05B 33/0803 |
| | | | | 315/149 |
| 2010/0271802 | A1* | 10/2010 | Recker | H05B 33/0803 |
| | | | | 362/20 |
| 2010/0327766 | A1* | 12/2010 | Recker | H02J 7/025 |
| | | | | 315/291 |
| 2011/0121654 | A1* | 5/2011 | Recker | H02J 9/065 |
| | | | | 307/66 |
| 2011/0133655 | A1* | 6/2011 | Recker | H02J 9/02 |
| | | | | 315/159 |
| 2011/0161687 | A1* | 6/2011 | Tajima | G06F 1/266 |
| | | | | 713/300 |
| 2012/0026726 | A1* | 2/2012 | Recker | F21K 9/13 |
| | | | | 362/157 |
| 2012/0080944 | A1* | 4/2012 | Recker | H02J 9/02 |
| | | | | 307/25 |
| 2013/0015982 | A1* | 1/2013 | Matsumoto | G06Q 50/06 |
| | | | | 340/870.02 |
| 2013/0053063 | A1* | 2/2013 | McSheffrey | G01S 1/02 |
| | | | | 455/456.1 |
| 2013/0342131 | A1* | 12/2013 | Recker | H05B 33/0842 |
| | | | | 315/292 |
| 2014/0097758 | A1* | 4/2014 | Recker | H05B 37/0272 |
| | | | | 315/152 |
| 2014/0312802 | A1 | 10/2014 | Recker et al. | |
| 2014/0320011 | A1* | 10/2014 | Hegarty | H05B 37/03 |
| | | | | 315/86 |
| 2014/0340222 | A1* | 11/2014 | Thornton | G08B 7/062 |
| | | | | 340/539.17 |
| 2015/0195883 | A1* | 7/2015 | Harris | H05B 33/0845 |
| | | | | 315/155 |
| 2015/0305116 | A1* | 10/2015 | Vora | H05B 37/029 |
| | | | | 315/292 |
| 2016/0034011 | A1* | 2/2016 | Tuleja | G05B 15/02 |
| | | | | 700/295 |
| 2016/0049054 | A1* | 2/2016 | Simmons | G08B 7/062 |
| | | | | 340/815.4 |
| 2016/0267753 | A1* | 9/2016 | Koosha | H04W 76/10 |
| 2017/0223807 | A1* | 8/2017 | Recker | H05B 37/0272 |
| 2017/0244609 | A1* | 8/2017 | Koosha | H04W 76/10 |

* cited by examiner

CONTROL AND MONITORING OF BATTERY-BACKED EMERGENCY LIGHTING SYSTEMS

CROSS-REFERENCE TO RELATED APPLICATIONS

This application is a continuation of recently allowed U.S. patent application Ser. No. 14/645,010, filed on Mar. 11, 2015, which is herein incorporated by reference in its entirety.

BACKGROUND

Battery backed emergency lighting systems require a considerable amount of routine monitoring and testing to ensure proper operation in the event of an emergency. The batteries have a finite life so users must be aware when replacement is due. The battery back-up requires occasional testing to check battery health and system readiness. Previously, such systems have relied on time consuming manual inspection, but more recently testing can be achieved using Digital Addressable Lighting Interface (DALI) or Zigbee communication interfaces.

However, DALI and Zigbee have a number of problems and limitations. For example, DALI only allows 64 slave nodes per master. This may result in the need for multiple master controllers in a large system. In addition, DALI requires wiring between each light for communication. Hence building a DALI system has the inconvenience of running cables through ceilings and walls.

Zigbee is a wireless communication system, with the disadvantage of a limited range. This is especially true in buildings containing a large amount of metal. Repeaters may be used to extend the range of Zigbee, however this adds additional cost and complexity to the Zigbee system. This can make the system complicated and make debugging communications problems difficult.

SUMMARY

In one embodiment, the present disclosure provides a method, non-transitory computer readable medium and apparatus for remotely receiving information from and configuring a battery-backed emergency lighting system. In one embodiment, the method comprises establishing a wireless communication session with a web server via a wireless fidelity (WiFi) connection, receiving a request for information related to the battery-backed emergency lighting system and a request to change a configuration of the battery-backed emergency lighting system over the wireless communication session, configuring the battery-backed emergency lighting system in accordance with the request to change the configuration and sending the information that is requested.

BRIEF DESCRIPTION OF THE DRAWINGS

So that the manner in which the above recited features of the present disclosure can be understood in detail, a more particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

As discussed above, battery backed emergency lighting systems require a considerable amount of routine monitoring and testing to ensure proper operation in the event of an emergency. However, currently available methods have many drawbacks including, wiring, a limited number of connections, a limited range, and the like.

Embodiments of the present disclosure provide the ability to remotely monitor and configure battery backed emergency lighting systems by configuring the battery backed emergency lighting systems with a Wireless Fidelity (WiFi) module that can communicate with a remotely located web server. The novel aspects of the present disclosure allow remotely located clients and endpoint devices to access the battery backed emergency lighting systems via the web server. As a result, the limitations and drawbacks of the previously available methods to monitor and test the battery backed emergency lighting systems are eliminated.

Figure 1:
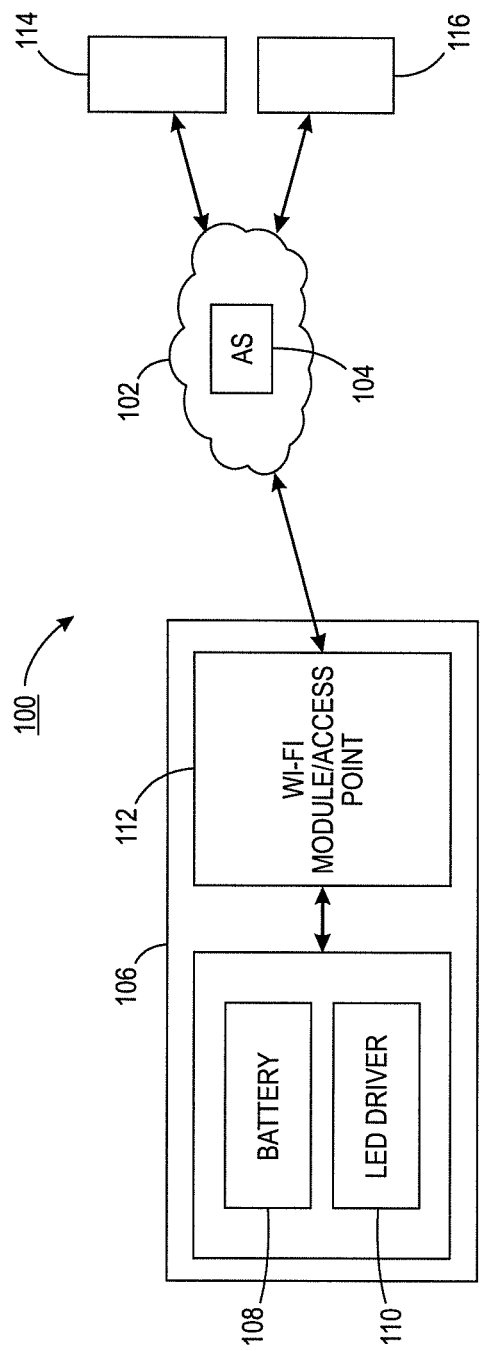
FIG. 1 depicts one example of a network diagram of the present disclosure.

FIG. 1 illustrates a high level block diagram of a communication network 100 of the present disclosure. In one embodiment, the network 100 may include an Internet Protocol (IP) network 102 that includes an application server (AS) 104. In one embodiment, the (AS) 104 may be deployed as a computer as illustrated and described below with respect to FIG. 3.

In one embodiment, the network 100 may include a battery backed emergency lighting system (BBELS) 106. In one embodiment, the BBELS 106 may include a WiFi module/Access Point 112, a battery 108 and a light emitting diode (LED) driver 110. In one embodiment, the LED driver 110 may include one or more LEDs. It should be noted that the BBELS 106 has been simplified and may include other components not shown. In addition, although a single BBELS 106 is illustrated in FIG. 1, the embodiments of the present disclosure may be used to request information from and/or request configuration changes for any number of BBELS 106 (e.g., multiple BBELS 106 in a single building, in multiple buildings, in various different locations, and the like).

In one embodiment, the BBELS 106 may be a lighting system that typically runs from a continuous power source (e.g., a standard 120 Volt outlet), which switches to the battery 108 if the continuous power source is disrupted. As discussed above, it is important that the BBELS 106 is properly configured to operate when power is lost and that the health and functionality of the battery 108 is periodically monitored and/or tested. Previously, the configuration and testing of the BBELS 106 was performed over a wired connection or using a wireless connection with a limited range. In other words, devices used to test the BBELS 106 would have to be within the limited range of the wireless connection or be directly wired to the BBELS 106.

In one embodiment of the present disclosure, the BBELS 106 is modified to include the WiFi module/Access Point 112. As a result, the BBELS 106 may be remotely configured or tested by remotely located endpoints 114 or 116 via the IP network 102 and the AS 104. In one embodiment the endpoints 114 or 116 may be any type of endpoint device including, such as for example, a smart phone, a tablet computer, a desktop computer, a laptop computer, a netbook computer, and the like.

In one embodiment, the endpoints 114 and 116 may be located at a different physical location (e.g., in another building, in another city, in another state, in another country, hundreds of miles away, and the like) than the BBELS 106. The endpoints 114 or 116 may be used to remotely configure and test the BBELS 106 from a much farther distance than previously possible using ZigBee communication protocols and without the need for a wired connection as with a DALI system.

In one embodiment, the AS 104 may host a web page that may be accessed by the endpoint 114 or 116 and used to request information related to the BBELS 106 and/or a request to change a configuration of the BBELS 106. In another embodiment, the WiFi module/Access Point 112 may host a web page that can be accessed by the endpoint 114 or 116 and used to request information related to the BBELS 106 and/or a request to change a configuration of the BBELS 106. A wireless communication session may be established between the AS 104 and the BBELS 106 via the Wi-Fi module/Access Point 112 to forward the requests to the BBELS 106.

In one embodiment, the wireless communication session may be established using the WiFi module/Access Point 112 as an access point and assigning a static IP address to a hosted web page. In another embodiment, the wireless communication session may be established using the WiFi module/Access Point 112 as a client having a dynamic host configuration protocol enabled that allows the WiFi module/Access Point 112 to be assigned any IP address and joining a WiFi network via a WiFi Protected Access (WPA) protocol.

In one embodiment, the request for information related to the BBELS 106 may include information related to the battery 108, a voltage of a light within the BBELS 106, a current of the light sources within the BBELS 106, and the like. For example, the information related to the battery 108 may include results of a battery health check, when the battery 108 was last replaced, when the battery 108 was last tested, a make and model of the battery 108, the last time the battery 108 was charged, how often the battery 108 was discharged, a history of when the BBELS 106 was operated in the battery back-up mode, and the like.

In one embodiment, the request to change the configuration of the BBELS 106 may include changing a schedule of automatic tests (e.g., automated battery tests, automated lighting tests, automated testing of a change over from the continuous power source to the battery 108, and the like), changing a light brightness profile when in a back-up mode, changing a light brightness profile during a normal operating mode, changing a configuration of the BBELS 106 to handle different power loads, and the like.

As a result, embodiments of the present disclosure allow the BBELS 106 to be accessed or re-configured remotely and wirelessly from a wider range than previously possible. As a result, maintaining, monitoring and checking the functionality of the BBELS 106 and the battery 108 of the BBELS 106 is made more convenient and efficient.

It should be noted that the communication network 100 has been simplified and that other access networks (e.g., cellular access networks, other IP networks, broadband communications networks, and the like) may be deployed between the Wi-Fi module/Access Point 112 and the IP network 102 and between the endpoints 114 and 116 and the IP network 102.

It should be noted that Wi-Fi is defined herein as a specific wireless communication technology that can be used to connect to the Internet (e.g., the AS 104 in the IP network 102) using the IEEE 802.11a/b/g/n standard. In another embodiment, Wi-Fi may be defined as a wireless communication technology that can be used to connect to the Internet (e.g., the AS 104 in the IP network 102) using a 2.4 Gigahertz (GHz) Ultra High Frequency (UHF) and 5 GHz Super High Frequency (SHF) radio waves. It should be noted that Wi-Fi is not intended to include short range wireless communication protocols such as ZigBee, Bluetooth, general Radio Frequency (RF), and the like that may have a limited range and cannot be used to connect to the Internet.

Figure 2:
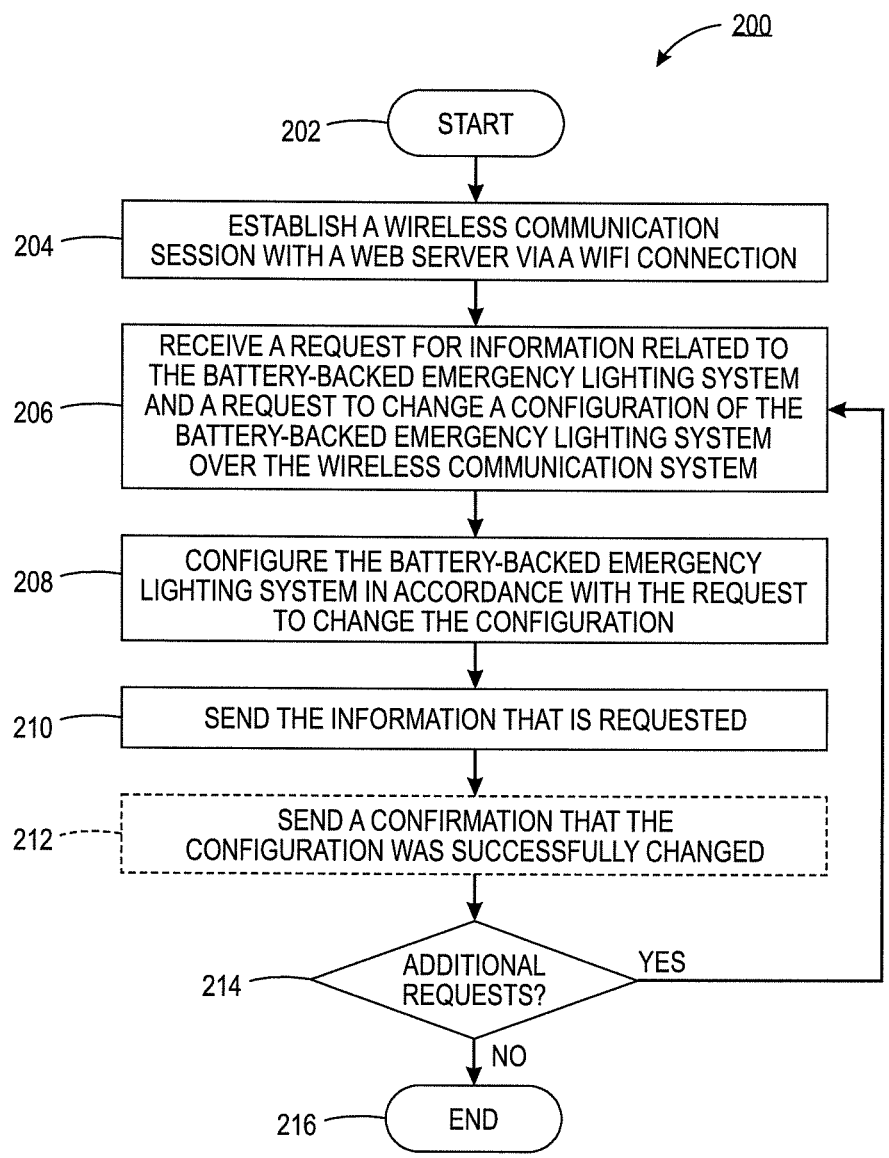
FIG. 2 depicts an example flow diagram of a method for remotely receiving information from and configuring a battery-backed emergency lighting system.

FIG. 2 illustrates an example flowchart of one embodiment of a method 200 for remotely receiving information from and configuring a battery-backed emergency lighting system. In one embodiment, the steps, functions or operations of the method 200 may be performed by the AS 104 or a computer described below in FIG. 3.

The method 200 begins at step 202. At step 204, the method 200 establishes a wireless communication session with a web server via a WiFi connection. In one embodiment, the web server may be an application server located remotely in an IP network. In one embodiment, the WiFi connection may be established by the battery backed emergency lighting system that is configured with a WiFi module/Access Point.

In one embodiment, the wireless communication session may be established using the WiFi module/Access Point as an access point and assigning a static IP address to a hosted web page. In another embodiment, the wireless communication session may be established using the WiFi module/Access Point as a client having a dynamic host configuration protocol enabled that allows the WiFi module/Access Point to be assigned any IP address and joining a WiFi network via a WiFi Protected Access (WPA) protocol.

At step 206, the method 200 receives a request for information related to the battery-backed emergency lighting system and a request to change a configuration of the battery-backed emergency lighting system over the wireless communication system. In one embodiment, the request may be initiated from an endpoint device in communication with a web server (e.g., the AS 104) and located remotely from the battery backed emergency lighting system.

In one embodiment, the request for information related to the battery-backed emergency lighting system may include information related to the battery, a voltage of a light within the battery-backed emergency lighting system, a current of the light sources within the battery-backed emergency lighting system, and the like. For example, the information related to the battery may include results of a battery health check, when the battery was last replaced, when the battery was last tested, a make and model of the battery, the last time the battery 108 was charged, how often the battery 108 was discharged, a history of when the BBELS 106 was operated in the battery back-up mode, and the like.

In one embodiment, the request to change the configuration of the battery-backed emergency lighting system may include changing a schedule of automatic tests (e.g., automated battery tests, automated lighting tests, automated testing of a change over from the continuous power source to the battery, and the like), changing a light brightness profile when in a back-up mode, changing a light brightness profile during a normal operating mode, changing a configuration of the battery-backed emergency lighting system to handle different power loads, and the like.

At step 208, the method 200 configures the battery-backed emergency lighting system in accordance with the request to change the configuration. For example, the schedule of the automatic testing may be modified in accordance with the request, the light brightness profile may be changed (e.g., making the battery-backed emergency lighting system brighter or dimmer during a back-up mode), and the like.

At step 210, the method 200 sends the information that is requested. For example, the battery-backed emergency lighting system may send information related to the battery that was requested back to the endpoint that initiated the request via the WiFi module/Access Point and the AS in the IP network.

At optional step 212, the method 200 may send a confirmation that the configuration was successfully changed. In one embodiment, the confirmation may be sent via a text message, an email, or a pop message displayed on the web page that is accessed by the endpoints. The confirmation will allow the user to see that the request to change the configuration of the battery-backed emergency lighting system was successfully changed.

At decision step 214, the method 200 determines if additional requests are received. If additional requests for configuration changes and/or information are received, then the method 200 may return to step 206. The method 200 may then repeat steps 206-214.

However, if no additional requests are received, the wireless communication session may be terminated and the method 200 may proceed to step 216. At step 216 the method 200 ends.

It should be noted that although not explicitly specified, one or more steps or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIG. 2 that recite a determining operation, or involve a decision, do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure.

Figure 3:
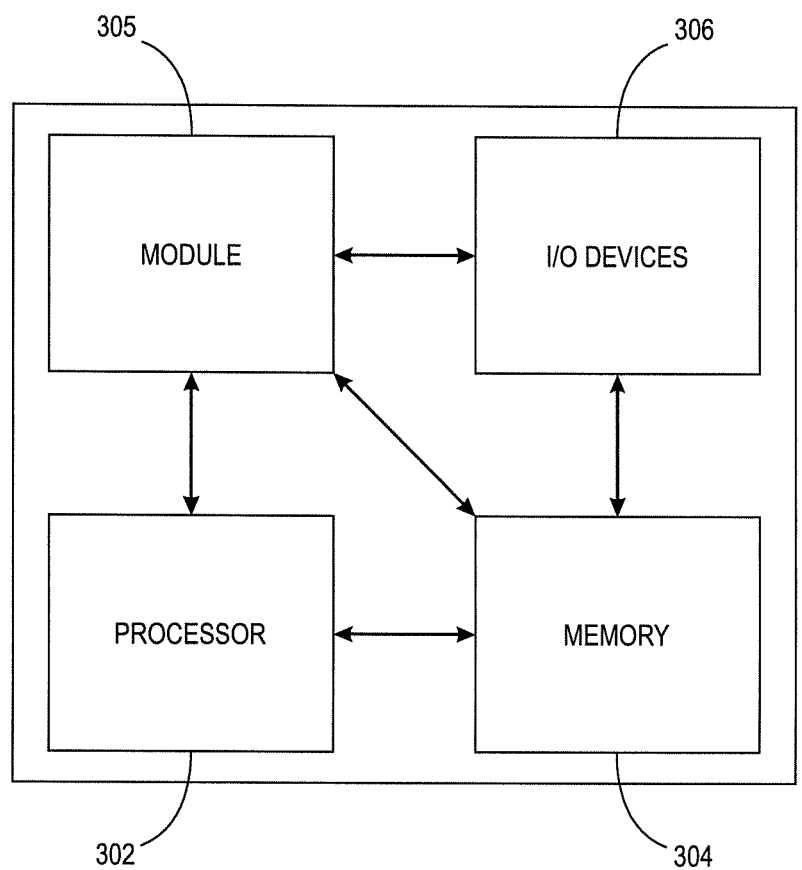
FIG. 3 depicts a high-level block diagram of a computer suitable for use in performing the functions described herein.

FIG. 3 depicts a high-level block diagram of a computer that can be transformed to into a machine that is dedicated to perform the functions described herein. Notably, no computer or machine currently exists that performs the functions as described herein. As a result, the embodiments of the present disclosure improve the operation and functioning of the general-purpose computer to develop complex queries, as disclosed herein.

As depicted in FIG. 3, the computer 300 comprises one or more hardware processor elements 302 (e.g., a Central Processing Unit (CPU), a microprocessor, or a multi-core processor), a memory 304, e.g., Random Access Memory (RAM) and/or Read Only Memory (ROM), a module 305 for remotely receiving information from and configuring a battery-backed emergency lighting system, and various input/output devices 306 (e.g., storage devices, including but not limited to, a tape drive, a floppy drive, a hard disk drive or a compact disk drive, a receiver, a transmitter, a speaker, a display, a speech synthesizer, an output port and an input port). Although only one processor element is shown, it should be noted that the general-purpose computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for remotely receiving information from and configuring a battery-backed emergency lighting system (e.g., a software program comprising computer-executable instructions) can be loaded into memory 304 and executed by hardware processor element 302 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for remotely receiving information from and configuring a battery-backed emergency lighting system (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   establishing, by a processor, a wireless communication session with a web server via a wireless fidelity (WiFi) connection;
   receiving, by the processor, a request to change a configuration of the battery-backed emergency lighting system over the wireless communication session, wherein the request the request to change the configuration is initiated from an endpoint device in communication with the web server that hosts a web page that receives the request from the endpoint device, wherein the request to change the configuration of the battery-backed emergency lighting system comprises changing a schedule of automatic tests or a light brightness profile when in a back-up mode;

configuring, by the processor, the battery-backed emergency lighting system in accordance with the request to change the configuration; and sending, by the processor, the information that is requested.

2. The method of claim 1, further comprising:

sending, by the processor, a confirmation that the configuration was successfully changed.

3. The method of claim 1, wherein the web server is located remotely from the battery-backed emergency lighting system.

4. The method of claim 1, the request for information related to the battery-backed emergency lighting system comprises information related to a battery, a voltage of a light source within the battery-backed emergency lighting system, or a current of the light source in the battery-backed emergency lighting system.

5. The method of claim 4, wherein the information related to the battery comprises results of a battery health check or when the battery was last replaced.

6. The method of claim 1, wherein the establishing the wireless communication session comprises:

using a WiFi module as an access point; and assigning a static internet protocol address to a hosted web page.

7. The method of claim 1, wherein the establishing the wireless communication session comprises:

using a WiFi module as a client having a dynamic host configuration protocol enabled that allows the WiFi module to be assigned any internet protocol address; and joining a WiFi network via a WiFi Protected Access (WPA) protocol.

8. A non-transitory computer-readable medium storing a plurality of instructions which, when executed by a processor, cause the processor to perform operations, the operations comprising:

establishing a wireless communication session with a web server via a wireless fidelity (WiFi) connection;

receiving a request to change a configuration of the battery-backed emergency lighting system over the wireless communication session, wherein the request the request to change the configuration is initiated from an endpoint device in communication with the web server that hosts a web page that receives the request from the endpoint device, wherein the request to change the configuration of the battery-backed emergency lighting system comprises changing a schedule of automatic tests or a light brightness profile when in a back-up mode;

configuring the battery-backed emergency lighting system in accordance with the request to change the configuration; and sending the information that is requested.

9. The non-transitory computer readable medium of claim 8, further comprising:

sending a confirmation that the configuration was successfully changed.

10. The non-transitory computer readable medium of claim 8, wherein the web server is located remotely from the battery-backed emergency lighting system.

11. The non-transitory computer readable medium of claim 8, wherein the request for information related to the battery-backed emergency lighting system comprises information related to a battery, a voltage of a light source within the battery-backed emergency lighting system or a current of the light source in the battery-backed emergency lighting system.

12. The non-transitory computer readable medium of claim 11, wherein the information related to the battery comprises results of a battery health check or when the battery was last replaced.

13. The non-transitory computer readable medium of claim 8, wherein the establishing the wireless communication session comprises:

using a WiFi module as an access point; and assigning a static internet protocol address to a hosted web page.

14. The non-transitory computer readable medium of claim 8, wherein the establishing the wireless communication session comprises:

using a WiFi module as a client having a dynamic host configuration protocol enabled that allows the WiFi module to be assigned any internet protocol address; and joining a WiFi network via a WiFi Protected Access (WPA) protocol.

15. An apparatus, comprising:

a processor; and a computer readable medium storing a plurality of instructions which, when executed by the processor, cause the processor to perform operations, the operations comprising:

establishing a wireless communication session with a web server via a wireless fidelity (WiFi) connection;

receiving, by the processor, a request to change a configuration of the battery-backed emergency lighting system over the wireless communication session, wherein the request the request to change the configuration is initiated from an endpoint device in communication with the web server that hosts a web page that receives the request from the endpoint device, wherein the request to change the configuration of the battery-backed emergency lighting system comprises changing a schedule of automatic test or a light brightness profile when in a back-up mode;

configuring the battery-backed emergency lighting system in accordance with the request to change the configuration; and sending the information that is requested.

16. The apparatus of claim 15, further comprising:

sending a confirmation that the configuration was successfully changed.

17. The apparatus of claim 15, wherein the web server is located remotely from the battery-backed emergency lighting system.

18. The apparatus of claim 15, wherein the request for information related to the battery-backed emergency lighting system comprises information related to a battery, a voltage of a light source within the battery-backed emergency lighting system or a current of the light source in the battery-backed emergency lighting system.

* * * * *